Jan. 13. 1925.  
J. D. RUYS  
MOLD  
Filed Nov. 27, 1923  
1,522,703  
2 Sheets-Sheet 1
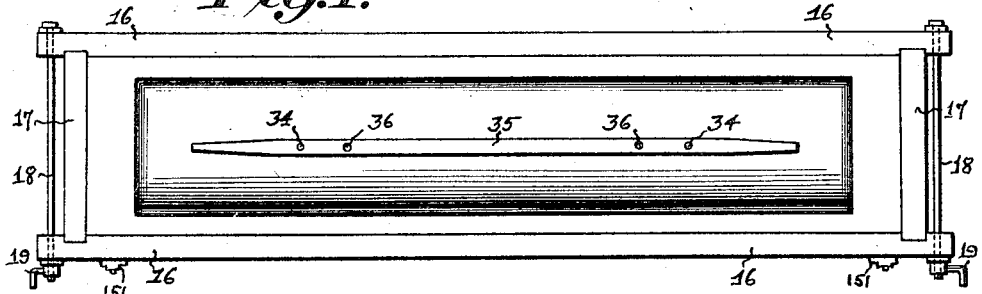
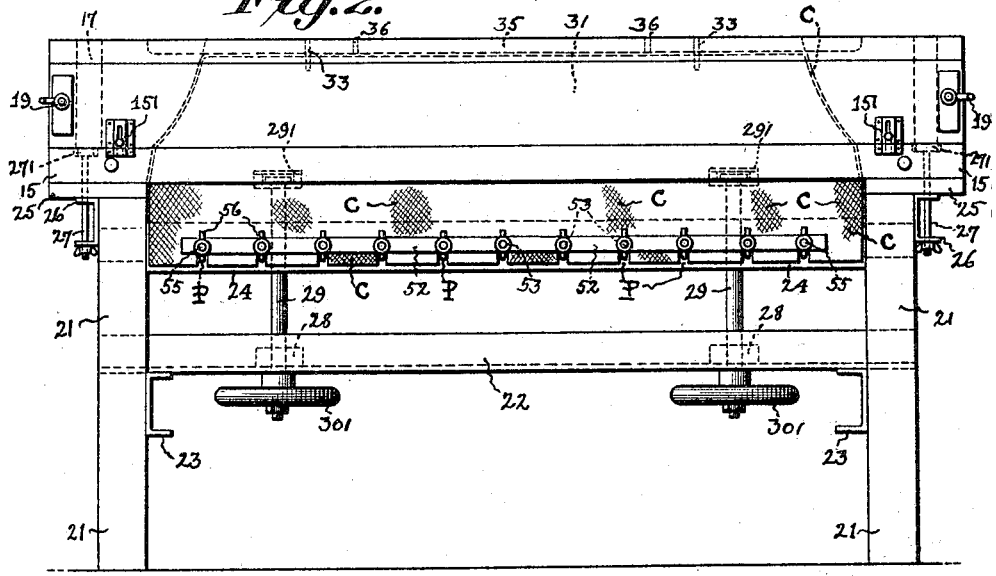
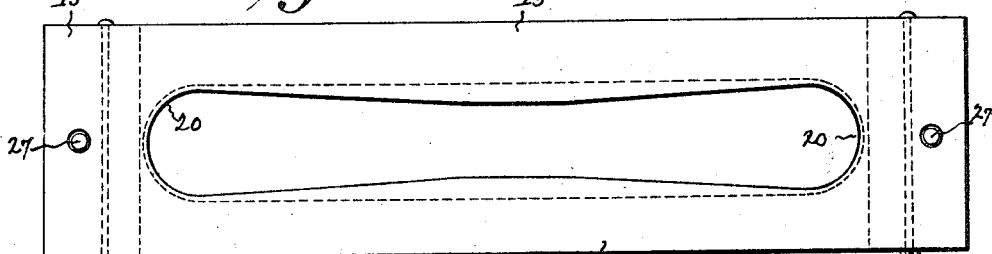
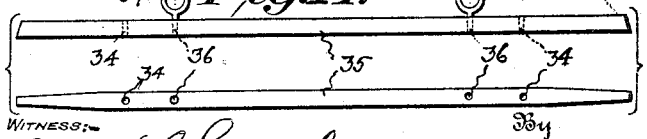
Inventor  
Jan Daniel Ruys,  
W. J. Schornborn  
WITNESS:—  
Chas. L. Griesbauer  
By  
Attorney Jan. 13. 1925.  1,522,703
J. D. RUYS
MOLD
Filed Nov. 27, 1923   2 Sheets-Sheet 2
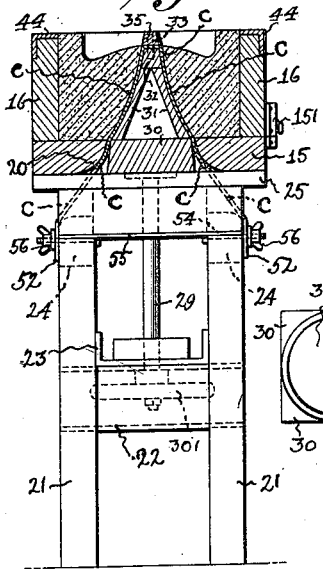
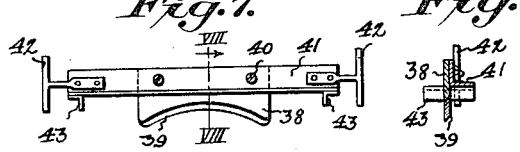
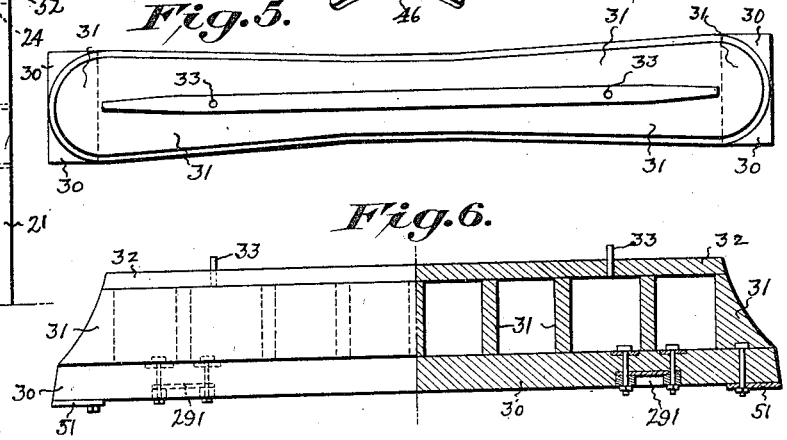
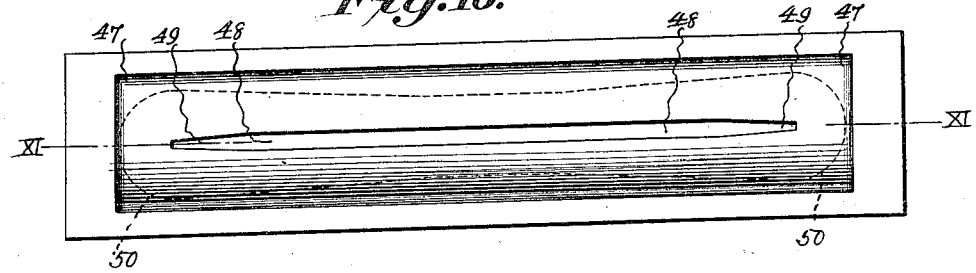
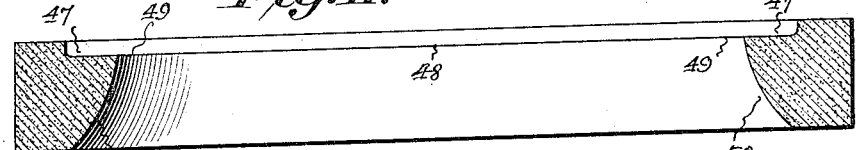
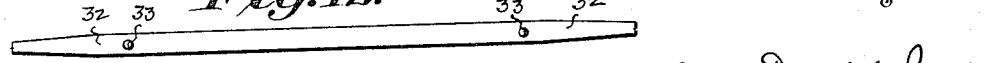

Patented Jan. 13, 1925.

1,522,703

UNITED STATES PATENT OFFICE.

JAN DANIEL RUYS, OF CLARKSBURG, WEST VIRGINIA.

MOLD.

Application filed November 27, 1923. Serial No. 677,258.

*To all whom it may concern:*

Be it known that I, JAN DANIEL RUYS, a subject of the Queen of Netherlands, residing at Clarksburg, in the county of Harrison and State of West Virginia, have invented certain new and useful Improvements in Molds, of which the following is a specification.

This invention relates to molds, and more particularly to a mold of such a construction as is specially adapted to making supply plates or "debiteuses" for use in drawing sheets of glass or the like, according to the Fourcault system, such as is disclosed, for example, in Fourcault's United States Letters Patent No. 837,822, dated December 4, 1906.

The main objects underlying my invention are to produce a mold of the above character which is capable of being easily and cheaply manufactured and readily operated with unskilled labor, which possesses few parts, and enables a float or "debiteuse" to be constructed which does not mar the texture and quality of the glass drawn through it.

I attain these objects under my invention by employing with the mold a cloth covered mold core of the exact form of the slot provided in the float and which can be readily removed from below without injury to the slot after it has been finished and after the float has been modeled to allow a quick drying of the clay of the float instead of the iron templet inserted from above, for forming the slot, usually employed, and which necessitates subsequent scraping, cutting and other treatment of the top and bottom of the modeled float, with frequent injury to the same.

Other features of my invention will be set forth hereinafter and pointed out in the claims.

With these and such other objects in view and realized advantages, as will be apparent from the description, my invention resides in the novel construction, combination and arrangement of parts, as hereinafter described and claimed, taken in connection with the accompanying drawings, in which:—

Figure 1 represents a plan view of my improved mold as assembled with core in place and debiteuse or float molded in place.

Figure 2 is a side elevation of the mold and its supporting structure or table.

Figure 3 is a top plan view of the bottom plate of the mold shown in Figure 1.

Figure 4 is an end elevation of the supporting table for the mold with the latter shown in vertical section taken through the center.

Figure 5 is a top plan view of the core.

Figure 6 is a side elevation, partly in vertical section, of the core shown in Figure 5.

Figure 7 is a front elevation of the scraper used in connection with the mold.

Figure 8 is a section of the scraper taken along line VIII—VIII of Figure 7.

Figure 9 is a front elevation of an additional scraper blade adapted to be substituted for the scraper blade shown in Figure 7.

Figure 10 is a top plan view of the finished float or "debiteuse" made in my improved mold.

Figure 11 is a vertical section of the float taken along line XI—XI of Figure 10.

Figure 12 is a detached plan view of the upper edge of the core.

Figure 13 is a side elevation of the core element shown in Figure 12, and

Figure 14 shows a plan and elevation of the combined guide for the scraper and clamp for the core covering cloth.

Referring now to the drawings and in particular to Figures 1, 2, 3 and 4, the form or frame in which the float is modeled or produced, comprises a base plate 15, two side plates or boards 16 and two end plates 17, let into the side plates, of wood or other suitable material, and suitably fastened together, as by bolts 18, provided with adjustable nuts 19 on their threaded ends, and the whole construction a substantially rectangular form or frame.

Said mold form comprising the side and ends 16 and 17 is suitably secured against lateral and longitudinal movement on said base plate 15 by any suitable means, such as slide bolts 151 or the like. (See Figures 1 and 4.)

The base plate has a properly spaced cut-out portion or recess 20 with rounded ends and tapering inwardly towards the center and upwardly toward the top as shown in Figures 3 and 4, through which the core to be described later is inserted. L-shaped wear plates 44 are let into the upper outer edges of the side plates 16.

The mold as described is supported on a table comprising four corner posts 21, braced by transverse longitudinal channel bars 22 and 23, respectively, and joined by connections or side pieces 24, and supporting top end pieces 25.

Under each end piece 25 and adjacent the top of posts 21 is secured a channel bar 26 through which a threaded bolt or rod 27 with its enlarged top end bearing in a counter-sunk recess 271 in base plate 15, is passed, and provided with a winged nut for holding the form to and on the table.

The channel bar 22 is provided near each end with openings and supports a threaded nut 28 above each opening through which a shaft 29 is adapted to be raised or lowered by means of hand wheel 301 for adjustably holding the core in position, and each shaft 29 has its upper end fitting into a recess 291. (See Figures 2 and 6).

On the outward vertical face of each side or connecting piece 24, of wood or the like, properly in the central portion, is arranged a clamping plate 52, provided with a series of alined spaced openings 53, corresponding to which are holes 54 in said side pieces through which horizontal rods 55 threaded at each end are adapted to extend, as shown in Figure 4. The threaded ends of the rods 55 are each provided with winged nuts 56. The side pieces 24 which are substantially rectangular in cross section, are curved at their upper outer edges, as indicated in Figure 4.

The core itself comprises a base member 30 with end and spaced middle supports 31 and a top member 32 suitably joined to make a compact and light member of cellular structure, tapering toward the top, rounded at the ends and narrowed toward the middle, as shown in Figures 5 and 6 and in detail in Figures 12 and 13.

In the top member are secured projecting pins 33 adapted to fit into openings 34 provided in the combined guide and clamp rail 35, which matches with member 32 but is continued in taper to its flat top, as shown in Figures 4 and 14. It is provided with threaded openings 36 into which lifting screw eyes 37 are adapted to be inserted when necessary to raise and disconnect its guide and clamp rail 35 from said top member 32.

On the ends of the base members 30 of the core are bolted or otherwise secured plates 51 to protect them against wear.

The scraper shown in Figures 7 and 8 comprises a centrally disposed vertical blade 38 with its lower edge 39 curved to conform to the curvature of the upper surface of the "debiteuse" and beveled so as to provide a cutting edge. This blade is positioned by means of screws 40 or the like to an L-shaped supporting member 41, preferably of angle iron, to the two side ends of the vertical arm of which member are secured handles 42 as by riveting them to it.

To the lower horizontal arm and flush with the ends of the supporting member 41 are secured L-shaped depending guiding rails 43, adapted to coact with or slide along the wear plates 44 (see Figure 4), and serve as an accurate alining and guiding means. The additional scraper blade 45 (see Figure 9), shaped substantially like blade 38, but provided with a grooved recess 46 at the center of its cutting edge and so as to fit over the guide and clamp rail 35 (see Figure 14) when it is in the position shown in Figure 4, may be substituted for blade 38, and fastened by screws 40 or the like, for use as a finished scraper. The cooperation of said scraper members with the mold members will be hereinafter more fully described.

The finished float or "debiteuse" (see Figures 10 and 11) is a substantially rectangular shaped body, made of plastic material, such as clay or the like, provided with a rectangular recessed portion 47 at its upper face in which is formed a longitudinal slot 48, the top central portion of which is of uniform width but narrowed at its ends 49, which have a substantially trapezoidal shape. Said slot flares downwardly and outwardly on a curve, as shown in Figures 4, 10 and 11, to end below in a smooth elliptical shaped opening 50 with substantially semi-circular ends and narrowed at the center, as shown in Figure 10.

In building up my mold for forming the float or "debiteuse," I usually proceed as follows:

The rectangular mold formed by the side plates 16 and end plates 17, held together by rods 18, is placed firmly upon the bar plate or drag 15 by letting the slide bolts 151 of the latter enter corresponding catches provided on the side plates 16.

Having lowered the core, without its top rail, sufficiently, by means of the hand wheels 301, I now place a separating layer, preferably a piece of flexible material, such as fine cloth C, over its top and sides, with the center of the cloth at the top, and perforated to pass over pins 33, and its sides hanging downwardly between the sides of the base plate 15 and the base of the core, and passing outwardly over the rounded edges of the side pieces 24 and under and below the loosened clamping plates 52. The lower ends of the sides of the cloth have cut-out portions P so as to permit the said cloth C to pass rods 55 without interference by them, as indicated in Figure 2. The cloth C is now pulled taut so that it lies as flat and close as possible against the core section and clamped tight by means of the plates 52 and winged nuts 56. The core may now be raised to its normal position by the hand wheels 301, whereby the cloth will be additionally held by the clamping action at the corners of the core base adjacent the rounded upper inner edges of the base plate or drag 15, as shown in Figure 4.

The guide and clamping rail 35 may now be secured on the top of the core shown in Figure 5 by permitting the pins 33 of the core to enter the openings 34 of the core.

Having thus or in any other preferred way assembled the mold, it may now be filled, as by ramming it, with any suitable plastic composition, such as clay, or a clay mixture to produce the desired float or "debiteuse." The purpose of the cloth around the core section is to prevent the core from sticking to the clay. It is also desirable to line the outer form with cloth for a similar purpose.

The scraper shown in Figure 7 is employed to remove the surplus clay near the ends of the mold and give the modeled clay the shape shown in Figure 4, and the scraper shown in Figure 9 is employed to shape the remainder of the top of the float by sliding it on the guide and clamp rail and also guiding it by the wear plates 44 (see Figure 4) with which it coacts.

As soon as the clay has dried out sufficiently, the core may be lowered by the hand wheels 301, so as to accelerate the drying out of the modeled float.

In order to obviate changes in the form of the latter, as far as possible, during the drying process, it is desirable to let it remain for a time on the drag board or base on which it has been modeled. After the elapse of sufficient time the slot shown in Figure 10 of the nearly finished float may be polished. This is not possible with the same success in the method ordinarily employed, because it is necessary to first make the slot slightly wet, which entails the loosening of small particles of wet clay from the dried clay and thus frequently causes a spoiling of the "debiteuse."

Furthermore, in the ordinary method of making a "debiteuse" clay is filled into a mold to a certain height and an iron templet, which has the exact form of the slot, is pressed into the clay. The upper part is then finished by scraping. After the elapse of a certain drying period in the ordinary method, the "debiteuse" is turned over and a portion of the clay from the bottom is removed with a scraper. A certain portion, however, is left in the center until after complete drying, when it must be removed by cutting it away. This operation may cause the spoiling of the "debiteuse", and as it is done by hand, may easily cause irregularities in its surface.

Under my invention and by my process, the "debiteuse" is made of a suitable clay without the necessity of any cutting out afterwards, and the surface of the slot is absolutely regular and smooth. It is obvious that the more perfect and smooth-surfaced the slot in the "debiteuse" is, the more perfect and smooth will be the sheets of glass drawn through the same.

What I claim is:—

1. In a mold for making a body provided with a recess in its base and a slot at its top, the combination of a mold frame provided with an opening in its base, a core adapted to adjustably fit said opening, said core being shaped to conform to said recess and slot, and means adapted to cooperate with the top surface of said core for shaping the top surface of material for making said body.

2. In a mold for making a supply float for drawing sheets of glass, said float having a recess in its base terminating above in a slot, the combination of a mold frame provided with an opening in its base, a core covered with a separating layer and adapted to adjustably fit said opening, said core being shaped to conform to said recess and slot, and means adapted to cooperate with the top surface of said covered core for shaping material for making the top of the supply float.

3. In a mold for making a supply float for drawing sheets of glass, said float having a recess in its base terminating above in a slot, the combination of a mold frame provided with an opening in its base, a core covered with a separating layer and adapted to adjustably fit said opening, said core being shaped to conform to said recess and slot, and means removably secured to the top of said covered core for guiding a scraping device for shaping material for making the top of the supply float.

4. In a mold for making a supply float for drawing sheets of glass, said float having a recess terminating above in a slot, the combination of a mold frame provided with an opening in its base, a core covered with a flexible material and adapted to fit said opening, said core being shaped to conform to said recess and slot and means removably secured to the top of said covered core for guiding a scraping device for shaping material for making the top of the supply float.

5. In a mold for making a supply float for drawing sheets of glass, said float having centrally a downwardly enlarged recess terminating above in an elongated narrow slot, the combination of a relatively stationary mold frame, provided with an opening in its base, a cloth-covered core adapted to be inserted into said opening from below and adjusted to closely fit into it, said core being shaped to conform to said recess and slot, and a clamping and guiding rail adapted to be secured to the top of said core for holding said cloth in place and guiding a scraping device for shaping plastic material filled into said mold frame to form said float.

6. In a mold for making a body provided with a recess in its base and a slot at its top, the combination of a mold frame provided with an opening in its base, a core adapted to adjustably fit said opening, said core being shaped to conform to said recess and slot, a support for said mold frame and slot, a flexible covering for said core, means provided on said support for retaining said covering on said core, and means adapted to cooperate with the top of said core for shaping the top surface of material for making said body.

7. In a mold for making a supply float for drawing sheets of glass, said float having a recess in its base terminating above in a slot, the combination of an upright mold frame provided with an opening in its base, wear plates on the top of its sides, a cloth-covered core adapted to adjustably fit said opening, said core being shaped to conform to said recess and slot, and means adapted to cooperate with the top of said core and said wear plates, comprising a scraper for shaping material for making said float.

In testimony whereof I affix my signature.

JAN DANIEL RUYS.